Dec. 4, 1951  G. C. HUPPERTZ  2,577,524
MULTIPLE CONTROL VALVE
Filed July 31, 1946  4 Sheets-Sheet 1
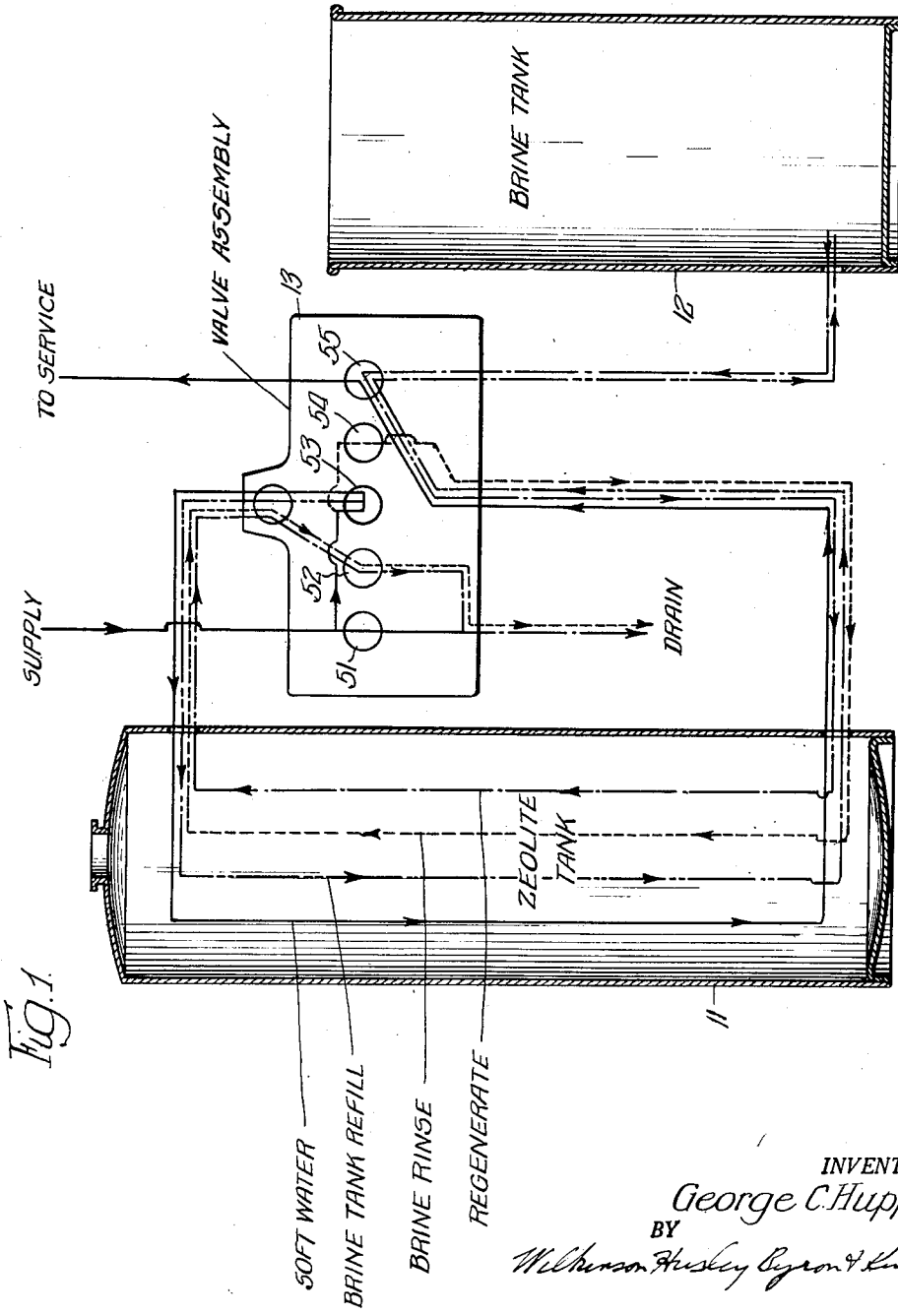
INVENTOR.
George C. Huppertz,
BY Dec. 4, 1951 G. C. HUPPERTZ 2,577,524
MULTIPLE CONTROL VALVE
Filed July 31, 1946 4 Sheets-Sheet 2
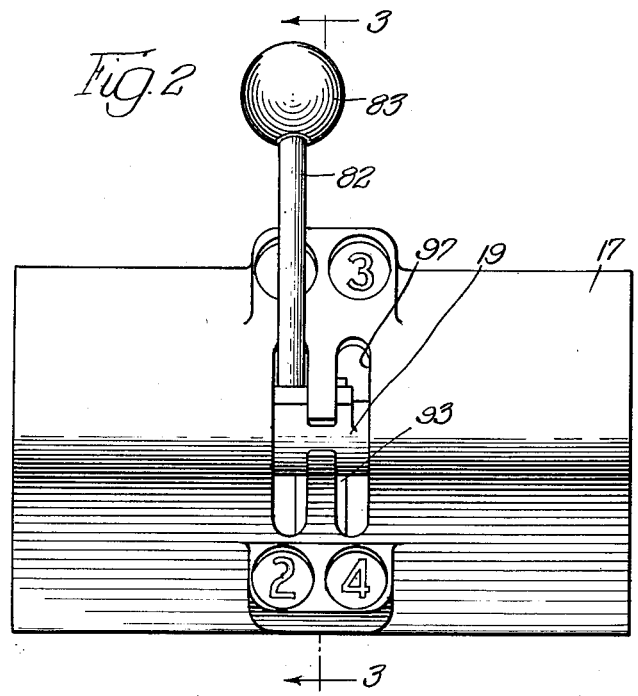
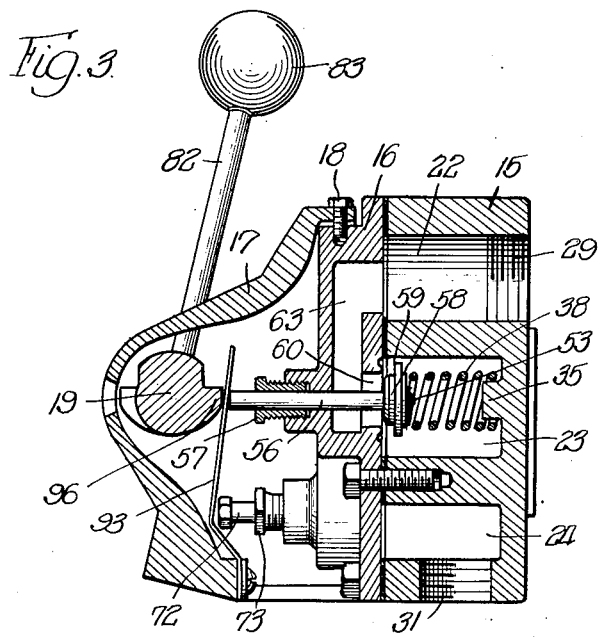
INVENTOR.
George C. Huppertz,
BY
Wilkinson Huxley Byron & Knight
Attys.

Dec. 4, 1951     G. C. HUPPERTZ     2,577,524
MULTIPLE CONTROL VALVE
Filed July 31, 1946     4 Sheets-Sheet 3
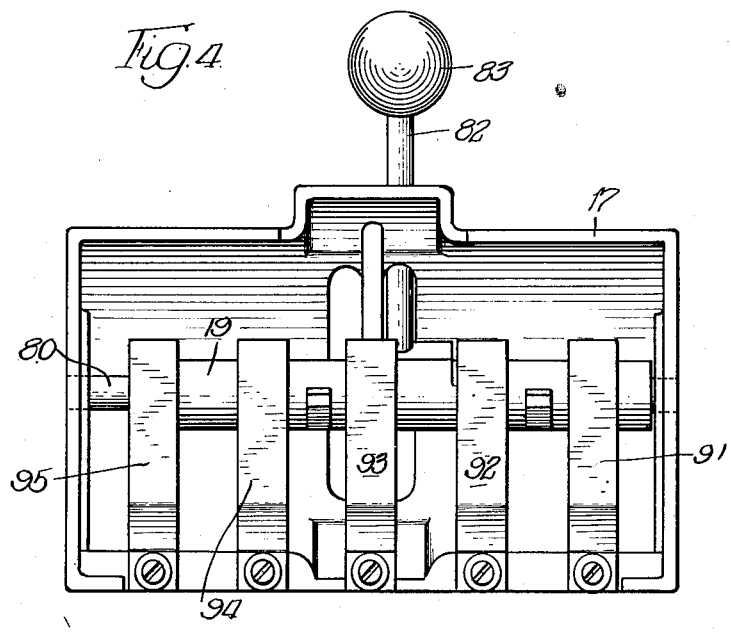
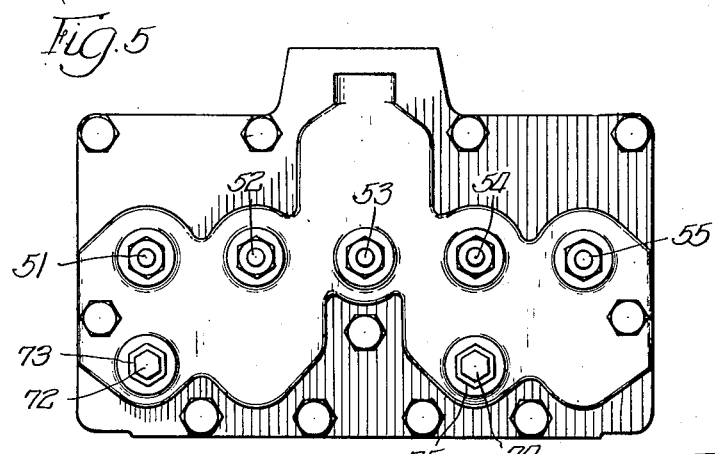
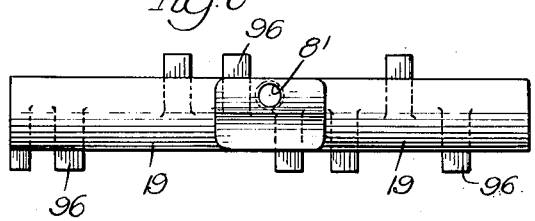
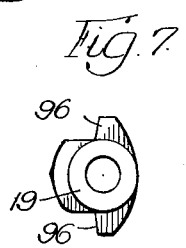
INVENTOR.
George C. Huppertz,
BY
Wilkinson Huxley Byron & Knight
Attys.

Dec. 4, 1951  G. C. HUPPERTZ  2,577,524
MULTIPLE CONTROL VALVE
Filed July 31, 1946  4 Sheets-Sheet 4

INVENTOR.
George C. Huppertz,
BY
Wilkinson, Huxley, Byron, & Knight
Attys.

Patented Dec. 4, 1951

2,577,524

UNITED STATES PATENT OFFICE 2,577,524

MULTIPLE CONTROL VALVE

George C. Huppertz, St. Charles, Ill.

Application July 31, 1946, Serial No. 687,336

4 Claims. (Cl. 277—20)

This invention relates to a new and improved multiple control valve and more particularly to a construction of this character including a plurality of valves and associated passages together with means for operating said valves in predetermined sequences and combinations.

The valve construction of the present invention is particularly adapted for use in connection with water softener installations where it serves to control the several cycles of regeneration and rinse of the zeolite, refilling the brine tank and again connecting the zeolite tank in the water supply circuit. It will be understood, however, that the construction is applicable to any installation where a plurality of lines of fluid flow are to be given various connections and interconnections which change from time to time in cyclic operation.

The construction comprises a valve housing assembly including a body casting and a closure member. The body includes water passages and chambers so designed as to conduct water to and from the several valves as they are opened and closed in predetermined relationship to establish the various circuits in the stages of the cycle of operation of the water softener. This body also serves as a manifold to which the various pipes are connected, which simplifies the piping and materially reduces the number of fittings required.

The closure member, mounted on the body, carries the valves and has passages formed therein leading from the valves to various chambers and passages in the body when the parts are in assembled relation. The closure also carries control means for certain of the passages, which control means may be adjusted by external means and locked in adjusted position independently of the operation of the valves.

A cover member is provided carrying the means for operating the several valves in predetermined sequence and relationship. It will be understood that the operation is not merely that of opening and closing a plurality of valves in sequence but of opening and closing predetermined combinations of valves. The construction is simple in that all the valves are identical in construction and each valve has only two positions, fully opened or fully closed.

It is an object of the present invention to provide a new and improved multiple control valve with cyclic operating mechanism in permanent association therewith.

It is a further object to provide a valve construction of this character in which the parts are largely interchangeable and are readily accessible for adjustment or servicing.

It is an additional object to provide a construction having certain flow control means which are adjustable independently of the valve operation.

It is also an object to provide a valve construction which includes interconnecting chambers and passages whereby connecting piping is simplified and the number of pipe fittings required is greatly reduced.

It is another object to provide a construction which is practically fool-proof in operation by means of a single operating handle with guided movements of said handle in a clearly indicated sequence.

Other and further objects will appear as the description proceeds.

I have shown certain preferred embodiments of my invention in the accompanying drawing in which—

Figure 1 is a diagrammatic view showing the valve and water softener assembly;

Figure 2 is a face view of the valve assembly;

Figure 3 is a section taken on line 3—3 of Figure 2;

Figure 4 is a view of the cover and the valve actuating assembly as seen from below;

Figure 5 is a face view of the valve assembly with the cover removed;

Figure 6 is a plan view of the valve actuating shaft;

Figure 7 is an end view of the shaft of Figure 6;

Figure 8:
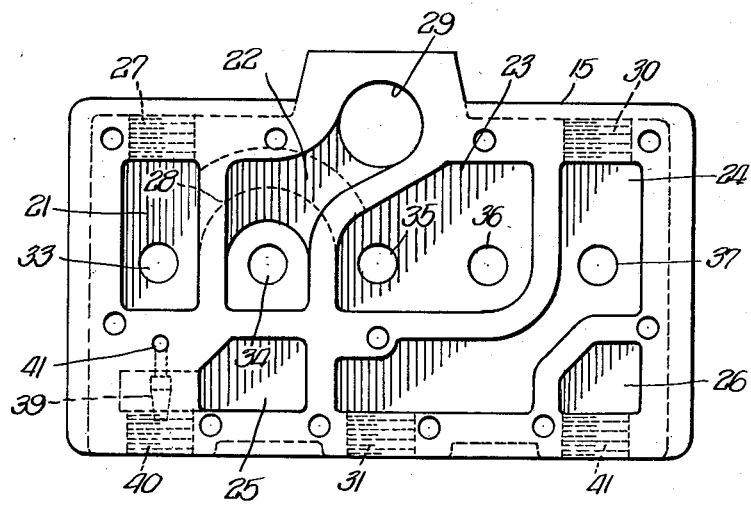
Figure 8 is a face view of the valve assembly body.

Referring first to Figure 1 of the drawing, the water softener assembly comprises the softener tank 11, the brine tank 12, the valve assembly 13 and the necessary piping connections to connect these elements to each other, to water supply, to the facilities using the water and to a drain for waste brine and flushing water. These connections will be discussed in detail hereafter in connection with the flow lines shown on Figure 1.

The valve assembly 13 comprises a body 15, a closure 16, a cover 17 secured to the closure 16 by machine screws 18, and a valve actuating shaft 19 carried by the cover 17, as best shown in Figure 3. The valve body 15, shown in plan view in Figure 8, is provided with a plurality of cavities 21, 22, 23, 24, 25 and 26. The cavity 21 is provided with a threaded connection 27 to which is connected the supply pipe leading hard water to the valve assembly. The cavity 21 is permanently connected to cavity 23 by the internal passage 28, indicated in broken lines.

The cavity 22 is provided with the threaded connection 29 in the rear of the body, shown also in Figure 3, for a pipe connecting the valve assembly 13 to the upper portion of the softener tank 11. The cavity 24 is provided with a threaded connection 30 in the upper face of the body 15 and with a second threaded opening 31 in the lower face of the body 15. The connection 30 has secured therein the pipe leading to the installation to be serviced with soft water. The connection 31 receives the pipe leading from the lower portion of the softener tank 11.

The cavities 21 and 22 have the studs 33 and 34 formed in their bottoms, the cavity 23 has two similar studs 35 and 36, and cavity 24 has stud 37. The stud 35 is shown in section in Figure 3 and carries a valve spring 38 as shown. All of the studs carry similar springs.

The cavity 25 carries the jet nozzle 39, shown in broken lines. This nozzle 39 is aligned with a threaded opening 40 adapted to receive a pipe connected to a drain. The nozzle 39 is fed through a passage connected to a small port 41 formed in the face of the valve body 15. The cavity 26 is provided with a threaded opening 41 adapted to be connected by a pipe to the lower portion of the brine tank 12.

Figure 9:
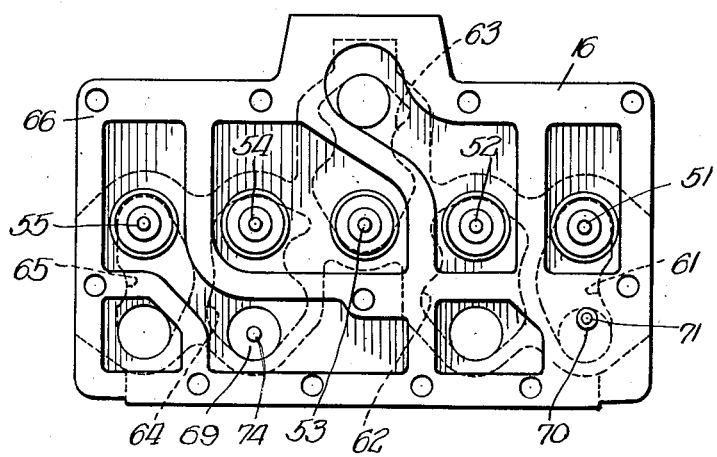
Figure 9 is a view of the underside of the valve assembly closure.

The valve closure 16 is shown from the under side in Figure 9 and, consequently, is reversed as regards Figure 8 which shows the body 15 in face view. This closure 16 contains a number of internal passages, which will be described, but has provision for no external connections. It carries a plurality of exactly similar valves 51, 52, 53, 54 and 55. Valve 53 is shown in Figure 3 and is typical of all the valves. This valve comprises the stem 56 passing through gland 57 and carrying a metal head 58 having a conical guide portion and supporting a composition disc 59 adapted to be thrust against the crown seat 60 by spring 38.

The valve 51 leads into a passage 61 which opens through port 70 over the small port 41 seen in Figure 8. The valve 52 leads into a passage 62 opening into the cavity 25. The valve 53 leads into a pasage 63 leading to cavity 22 and to opening 29. The valve 54 leads to passage 64 opening into cavity 24 and opening 31. Valve 55 leads to passage 65 opening to cavity 26 and opening 41. The solid inner lines on Figure 9 indicate a gasket 66 and serve to show the relationship of the cavities in Figure 8 to the valves and passages in Figure 9.

The port 70 of Figure 9 is controlled by a plunger 71 which is carried on a threaded bolt having its head 72 extending up above the valve closure for adjustment, as shown in Figure 5. When adjusted, it is held in position by lock nut 73. Flow through passage 64 into cavity 24 is controlled by a disc 69 carried by a bolt 74, shown in Figure 5, and provided with a lock nut 75.

The valve body cover 17, as best shown in Figures 3 and 4, is provided with a rod 80 on which the valve actuating shaft 19 is free to rotate and to slide. The shaft 19 has a threaded opening 81 to receive an operating arm 82 having a ball handle 83. Below the shaft 19 are located flat spring strips 91, 92, 93, 94 and 95 which are placed above valve stem 51 to 55, respectively. When each spring strip is depressed it depresses the corresponding valve. The shaft 19 carries a plurality of cam lugs 96 which are adapted to engage and depress spring strips to actuate or open valves in predetermined combinations upon corresponding positioning of the shaft 19.

The valve housing cover 19 has formed therein the H-shaped slot or opening 97 which serves to guide the operating arm 82 to one of four marked positions, as shown in Figure 2. With the arm 82 in neutral position in the cross of the H all valves are closed. When the operating arm 82 is moved from any position to any other position it passes through a central position when all valves are closed. A plurality of valve combinations are afforded by a simple rotary movement and, when the operating arm is given a linear movement, a further plurality of combinations is available by subsequent rotary movement.

In the operation of the valve assembly in connection with water softening apparatus, the valves and connections are adjusted for normal flow of water from the source of supply through the zeolite tank to the service main with the operating arm 82 in the number 1 position, in which it is shown in Figure 2. When the arm is in this position, one of the cam lugs 96 on the valve actuating shaft 19 depresses spring 93 to open valve 53 by pressing downwardly upon the valve stem. The water now flows from the supply main through threaded opening 27 into cavity 21, through the lower passage 28 into cavity 23, through valve 53 to the closure passage 63 into cavity 22 and out through opening 29 into the pipe leading into the upper portion of the zeolite tank. From the lower portion of the zeolite tank, the flow passes through a pipe into lower opening 31 in the valve housing into cavity 24 and out through opening 30 to the service main. This flow line has been indicated in full lines on Figure 1.

When it is desired to regenerate the zeolite, the valve operating arm 82 is swung downwardly, as seen in Figure 2, to the number 2 position. In this position cam lugs 96 press down on springs 91, 92 and 95 opening the corresponding valves 51, 52 and 55. This flow is indicated on Figure 1 in the line comprising long dashes separated by single dots. Brine flows from the pipe leaving the lower portion of the brine tank through opening 41 in the lower right portion of the valve body, shown in Figure 8. It then flows up through the passage 65 in the closure and down through valve 55 into cavity 24 and out of the valve housing through opening 31 and through the connecting pipe into the lower end of the zeolite tank. The brine passes up through the zeolite tank and out through the upper pipe, entering the valve housing again through the upper rear opening 29 in the valve housing 15. From opening 29, it passes into cavity 22, up through valve 52 into the passage 62 in the closure and down into cavity 25 in the valve housing. From this cavity it passes through opening 40 to the waste pipe or drain pipe.

It will be understood that, since the brine in the brine tank is not under pressure, it is necessary to provide means for moving this flow of brine through the zeolite tank and out through the drain. This is accomplished by injection of a high pressure water flow through the jet nozzle 39 directed into opening 40. The flow of this high pressure water is from the supply main into opening 27 and thus into cavity 21. From cavity 21 the high pressure water passes through valve 51 into passage 61 in the valve housing cover. From passage 64 the high pressure water passes through port 70 in the cover and down into port 41 in the valve housing, which port leads to the jet nozzle 39. The flow of this high pressure water through port 70 is controlled by adjustment of the plunger 71 carried by threaded bolt 72. It will be understood that this adjustment may be made at the time of installation and will be dependent on the normal water pressure and the relative location of the several elements of the water softening assembly. Once adjusted, it need not be varied unless changes in the assembly or normal water pressure occur.

When the zeolite has been adequately regenerated by passage of a suitable amount of brine through the zeolite tank, the valve operating arm 82 is swung upwardly and laterally to the number 3 position to rinse out the brine from the zeolite tank. When the handle is in this position, valves 52 and 54 are opened. This flow is indicated on Figure 1 of the drawing by the line made up of short dashes. The rinse water enters from the supply main through opening 27 into cavity 21, thence through lower passage 28 into cavity 23. From cavity 23, this water passes upwardly through valve 54 into passage 64 in the closure 16. From passage 64 it passes downwardly past control disc 73 into cavity 24, from which it passes out through opening 31, and through the pipe into the lower end of the zeolite tank. From the upper end of the zeolite tank the brine laden water passes through the pipe into opening 29 in the rear of the valve housing body 15 and into cavity 22 therein. From cavity 22 the water passes up through valve 52 into passage 62 in the valve housing cover 16 and downwardly into cavity 25, from which it passes out through opening 40 to the drain or waste pipe. It will be noted that this water is under pressure and consequently there is no necessity for flow through the jet nozzle 39.

The next step after the rinsing out of the zeolite tank is the refilling of the brine tank. This is accomplished by swinging operating arm 82 downwardly to number 4 position. In this position, valves 53 and 55 are opened and the path of the water is indicated by the line made up of long dashes separated by two short dashes. The water enters, as before, from the supply main through opening 27, cavity 21 and lower passage 28 into cavity 23. From cavity 23 the water passes upwardly from valve 53 and through passage 63 back into the valve body in cavity 22. From cavity 22 water flows through opening 29 and the pipe into the upper portion of the zeolite tank. It flows downwardly through the zeolite tank giving an additional downward rinse, at the same time it removes a hard water "head" in the bottom of the softener tank, and from the bottom of the tank passes through the pipe up into opening 31 at the bottom of the valve housing 15. From opening 31 it enters cavity 24, passing upwardly through valve 55, enters the passage 65 in the housing closure 16. From passage 65 it re-enters the valve body into cavity 26, from which it passes through the opening 41 and the connecting pipe into the lower end of the brine tank. When this tank has been filled to the desired level, the valve operating arm 82 is returned to position number 1 and the entire apparatus is again supplying soft water to the service main.

This downward flow of the water through the zeolite tank in refilling the brine tank has several advantages. It provides soft water for forming the brine in addition to removing all hard water from the zeolite tank, thus providing soft water instantly when the operating arm 82 is swung back to the number 1 position.

It will be apparent that the entire sequence of operations can be carried out effectively and efficiently by movement of a single lever. There is no possibility of any incorrect operations, such as to damage the parts or to misdirect any flow. The initial installation can have the water jet for the regenerating or brining properly adjusted so that the user need make no further adjustment. Also, the rinse flow may be initially adjusted by the location of the control disc 73 so as to send the water through in the proper amount to give adequate rinsing without stirring up the zeolite bed to an undesired extent or carrying zeolite upwardly in the tank to the outflow. Consequently, the entire installation is substantially fool-proof and suitable for use in connection with domestic water softening apparatus which is operated and handled by persons without mechanical experience.

The flat spring members 91 to 95 are used so as to prevent any wiping action or lateral thrust upon the valve stems during the valve operation. The wiping action is between the cams 96 and the springs, and the springs themselves have sufficient length so that while the outer portions move in an arc, the arc is so flat and the movement so short there is no substantial lateral thrust on the valve stems. As shown in Figure 3, the ends of the cam lugs 96 are flattened and thus the springs have the added effect of bearing against these flattened ends and holding the valve actuating shaft in the position to which it may be adjusted.

It will be apparent that the entire assembly is such as to require a minimum of servicing or adjusting subsequent to installation. Should such servicing be necessary, however, it may be accomplished very readily by removing the valve closure 16, which carries all of the valves and exposes all of the cavities. The valves, or packing washers, are thus readily accessible and the lifting of the valves exposes the valve seats should these need an adjustment. Springs which urge the valve body to closed position are also exposed and may be replaced if necessary. It will, therefore, be apparent that the entire assembly is not only adapted for operating by unskilled persons, but also is adapted for ready servicing by trained personnel if that should prove necessary.

The present construction affords substantial advantages over valve controls which involve a rotary movement or a sliding movement. While this construction provides for a simple progressive cycle of operation, it permits any desired modification of that cycle. As the valve control passes from any setting to any other setting, the assembly passes through a position in which all valves are closed and all flow stopped. It is possible to pass from any setting directly to any other setting with only an intermediate passage through a neutral position. For example, it is possible to shift directly from the softening position to the backwashing position without the brining or regenerating step. This makes it possible to backwash the softener frequently between brining or regenerating periods if the water supply is of a nature that would deposit sediment and silt in the softening bed.

While I have shown certain preferred embodiments of my invention, it will be understood that

I claim:

1. A multiple valve construction comprising a valve body having a plurality of cavities therein, said body having a plurality of external pipe connection openings connected with certain of the cavities, a closure member on said body, passages formed in said closure member, said passages connecting certain of the body cavities, and valves for controlling flow through the passages, valve stems extending externally of the body through the closure member, and valve actuating means mounted on the member and adapted to selectively engage said stems to operate certain valves jointly or separately, said actuating means comprising a movable member having a plurality of spaced and oppositely extending valve operating cams projecting therefrom and an operating arm for moving said movable member axially and rotationally to cause selected cams to depress selected valves.

2. A multiple valve construction comprising a valve body having a plurality of cavities therein, said body having a plurality of external pipe connection openings connected with certain of the cavities, a closure member on said body, passages formed in said closure member, said passages connecting certain of the body cavities, and valves for controlling flow through the passages, valve stems extending externally of the body through the closure member, and valve actuating means mounted on the member and adapted to selectively engage said stems to operate certain valves jointly or separately, said actuating means comprising a member having a plurality of spaced and oppositely extending valve operating cams projecting therefrom, said member being mounted for axial and rotational movement, an operating arm rigidly connected thereto for moving the actuating means member, and means for guiding the movement of the operating arm to cause movement of the actuating means member such that selected cams will engage said stems to operate selected valves.

3. A multiple valve construction comprising a valve body having a plurality of cavities therein, said body having a plurality of external pipe connection openings connected with certain of the cavities, a closure member on said body, passages formed in said closure member, said passages connecting certain of the body cavities, and valves for controlling flow through the passages, valve stems extending externally of the body through the closure member, and valve actuating means mounted on the member and adapted to selectively operate certain valves jointly or separately, said actuating means comprising a member having a plurality of spaced and oppositely extending valve operating cams projecting therefrom, said member being mounted for axial and rotational movement, an operating arm rigidly connected thereto for moving the actuating means member, a cover for said actuating means, said cover having a slotted opening formed therein, the operating arm extending through the slotted opening and being guided in its movement by said opening to cause movement of the actuating means member such that selected cams will engage said stems to operate selected valves.

4. A multiple valve construction comprising a valve body having a plurality of cavities therein, said body having a plurality of external pipe connection openings connected with certain of the cavities, a closure member on said body, passages formed in said closure member, said passages connecting certain of the body cavities, and valves for controlling flow through the passages, valve stems extending externally of the body through the closure member, and valve actuating means mounted on the member and adapted to selectively operate certain valves jointly or separately, said actuating means comprising a member having a plurality of spaced and oppositely extending valve operating cams projecting therefrom, said member being mounted for axial and rotational movement, an operating arm rigidly connected thereto for moving the actuating means member, a cover for said actuating means, said cover having an H shaped opening formed therein, the operating arm extending through said opening and being guided in its movement by the opening to four valve open positions with selected cams operating selected valves and to a neutral position with all valves closed.

GEORGE C. HUPPERTZ.

REFERENCES CITED

The following references are of record in the file of this patent:

UNITED STATES PATENTS

| Number | Name | Date |
| --- | --- | --- |
| 2,222,704 | Brown | Nov. 26, 1940 |
| 2,231,460 | Barman | Feb. 11, 1941 |
| 2,275,963 | Herman | Mar. 10, 1942 |
| 2,297,026 | Sanford | Sept. 29, 1942 |
| 2,302,663 | Campbell | Nov. 24, 1942 |
| 2,336,715 | Casler | Dec. 14, 1943 |
| 2,460,011 | Hungerford | Jan. 25, 1949 |
| 2,472,309 | Opsahl | June 7, 1949 |

FOREIGN PATENTS

| Number | Country | Date |
| --- | --- | --- |
| 445,559 | Great Britain | Apr. 14, 1936 |